United States Patent
Hahm et al.

(10) Patent No.: US 8,208,856 B2
(45) Date of Patent: Jun. 26, 2012

(54) METHOD AND SYSTEM FOR A PROGRAMMABLE INTERFERENCE SUPPRESSION MODULE

(75) Inventors: Mark Hahm, Hartland, WI (US); Wei Luo, Marlboro, NJ (US); Thirunathan Sutharsan, San Diego, CA (US); Andrew du Preez, San Diego, CA (US); Bin Liu, San Diego, CA (US); Jun Wu, San Diego, CA (US); Severine Catreux-Erceg, Cardiff, CA (US); Shuangquan Wang, Maple Shade, NJ (US)

(73) Assignee: Broadcom Corporation, Irvine, CA (US)

( * ) Notice: Subject to any disclaimer, the term of this patent is extended or adjusted under 35 U.S.C. 154(b) by 352 days.

(21) Appl. No.: 12/686,623

(22) Filed: Jan. 13, 2010

(65) Prior Publication Data

US 2011/0151888 A1      Jun. 23, 2011

Related U.S. Application Data

(60) Provisional application No. 61/288,008, filed on Dec. 18, 2009.

(51) Int. Cl.
*H04B 1/00* (2006.01)
(52) U.S. Cl. .................. 455/63.1; 455/114.1; 455/114.2; 455/278.1; 375/214
(58) Field of Classification Search .................. 455/63.1, 455/114.1, 114.2, 278.1, 296, 179.1; 375/214
See application file for complete search history.

(56) References Cited

U.S. PATENT DOCUMENTS

| | | | |
|---|---|---|---|
| 5,812,066 A * | 9/1998 | Terk et al. ................... | 340/12.29 |
| 7,085,314 B2 * | 8/2006 | Zhu et al. ...................... | 375/214 |
| 7,620,369 B2 * | 11/2009 | Molisch et al. ............. | 455/67.11 |
| 7,636,407 B2 * | 12/2009 | Maeda et al. ................. | 375/349 |
| 2002/0039383 A1 * | 4/2002 | Zhu et al. ...................... | 375/214 |
| 2006/0067446 A1 * | 3/2006 | Maeda et al. ................. | 375/349 |
| 2011/0176581 A1 * | 7/2011 | Thomas et al. ............... | 375/146 |

* cited by examiner

*Primary Examiner* — Minh D Dao
(74) *Attorney, Agent, or Firm* — Sterne, Kessler, Goldstein & Fox PLLC

(57) ABSTRACT

Aspects of a method and system for a programmable interference suppression module may include receiving a communication signal comprising one or more desired signal, and one or more undesired signals. The communication signal may be utilized to generate estimated channel state information. The estimated channel state information may be formatted for use in interference suppression. A reduced interference signal may be generated from a delayed version of said communications signal and the estimated channel state information, wherein the one or more undesired signals may be attenuated. The reduced interference signal may be formatted for post-processing. The desired signals may comprise WCDMA and/or HSDPA signals, and the undesired signals may be inter-cell and/or intra-cell interference. Further processing may comprise HSDPA processing and/or RAKE finger processing. The communication signal may be a Universal Mobile Telecommunication System (UMTS) compliant signal.

20 Claims, 5 Drawing Sheets

METHOD AND SYSTEM FOR A PROGRAMMABLE INTERFERENCE SUPPRESSION MODULE

CROSS-REFERENCE TO RELATED APPLICATIONS/INCORPORATION BY REFERENCE

This application makes reference to, claims priority to, and claims the benefit of U.S. Provisional Application Ser. No. 61/288,008, filed on Dec. 18, 2009.

FIELD OF THE INVENTION

Certain embodiments of the invention relate to communication. More specifically, certain embodiments of the invention relate to a method and system for a programmable interference suppression module.

BACKGROUND OF THE INVENTION

Wideband code division multiple access (WCDMA) is a third generation (3G) cellular technology that enables the concurrent transmission of a plurality of distinct digital signals via a common RF channel. WCDMA supports a range of communications services that include voice, high speed data and video communications. One such high speed data communications service, which is based on WCDMA technology, is the high speed downlink packet access (HSDPA) service.

WCDMA is a spread spectrum technology in which each digital signal is coded or "spread" across the RF channel bandwidth using a spreading code. Each of the bits in the coded digital signal is referred to as a "chip". A given base transceiver station (BTS), which concurrently transmits a plurality of distinct digital signals, may encode each of a plurality of distinct digital signals by utilizing a different spreading code for each distinct digital signal. At a typical BTS, each of these spreading codes is referred to as a Walsh code. The Walsh coded digital signal may in turn be scrambled by utilizing a pseudo-noise (PN) bit sequence to generate chips. An example of a PN bit sequence is a Gold code. Each of a plurality of BTS within an RF coverage area may utilize a distinct PN bit sequence. Consequently, Walsh codes may be utilized to distinguish distinct digital signals concurrently transmitted from a given BTS via a common RF channel while PN bit sequences may be utilized to distinguish digital signals transmitted by distinct BTSs. The utilization of Walsh codes and PN sequences may increase RF frequency spectrum utilization by allowing a larger number of wireless communications to occur concurrently within a given RF frequency spectrum. Accordingly, a greater number of users may utilize mobile communication devices, such as mobile telephones, Smart phones and/or wireless computing devices, to communicate concurrently via wireless communication networks.

A user utilizing a mobile communication device, MU_1, may be engaged in a communication session with a user utilizing a mobile communication device MU_2 via a base transceiver station, BTS_A within wireless communication network. For example, the mobile communication device MU_1 may transmit a digital signal to the BTS_A, which the base transceiver station BTS_A may then transmit to the mobile communication device MU_2. The base transceiver station BTS_A may encode signals received from the mobile communication device MU_1 and transmitted to the mobile communication device MU_2 by utilizing a Walsh code, W_12, and a PN sequence, PN_A. The mobile communication device MU_2 may receive signals transmitted concurrently by a plurality of base transceiver stations (BTSs) in addition to the base transceiver station BTS_A within a given RF coverage area. The mobile communication device MU_2 may process the received signals by utilizing a descrambling code that is based on the PN sequence PN_A and a despreading code that is based on the Walsh code W_12. In doing so, the mobile communication device MU_2 may detect a highest relative signal energy level for signals received from base transceiver station BTS_A, which comprise a digital signal corresponding to mobile communication device MU_1.

However, the mobile communication device MU_2 may also detect signal energy from the digital signals, which correspond to signals from mobile communication devices other than the mobile communication device MU_1. The other signal energy levels from each of these other mobile communication devices may be approximated by Gaussian white noise, but the aggregate noise signal energy level among the other mobile communication device may increase in proportion to the number of other mobile communication devices whose signals are received at the mobile communication device MU_2. This aggregate noise signal energy level may be referred to as multiple access interference (MAI). The MAI may result from signals transmitted by the base transceiver station BTS_A, which originate from signal received at the base transceiver station BTS_A from mobile communication devices other than mobile communication device MU_1. The MAI may also result from signals transmitted by the base transceiver stations BTSs other than the base transceiver station BTS_A. The MAI and other sources of noise signal energy may interfere with the ability of MU_2 to successfully decode signals received from MU_1.

An additional source of noise signal energy may result from multipath interference. The digital signal energy corresponding to the mobile communication device MU_2, which is transmitted by the base transceiver station BTS_A may disperse in a wavefront referred to as a multipath. Each of the components of the multipath may be referred to as a multipath signal. Each of the multipath signals may experience a different signal propagation path from the base transceiver station BTS_A to the mobile communication device MU_2. Accordingly, different multipath signals may arrive at different time instants at the mobile communication device MU_2. The time duration, which begins at the time instant that the first multipath signal arrives at the mobile communication device MU_2 and ends at the time instant that the last multipath signal arrives at the mobile communication device MU_2 is referred to as a delay spread. The mobile communication device MU_2 may utilize a rake receiver that allows the mobile communication device MU_2 to receive signal energy from a plurality of multipath signals received within a receive window time duration. The receive window time duration may comprise at least a portion of the delay spread time duration. Multipath signals, which are not received within the receive window time duration may also contribute to noise signal energy.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a programmable interference suppression module, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a programmable interference suppression module. Aspects of the method and system for a programmable interference suppression module may comprise receiving a communication signal comprising one or more desired signal, and one or more undesired signals. The communication signal may be utilized to generate estimated channel state information. The estimated channel state information may be formatted for use in interference suppression. A reduced interference signal may be generated from a delayed version of said communications signal and the estimated channel state information, wherein the one or more undesired signals may be attenuated. The reduced interference signal may be formatted for post-processing. The desired signals may comprise WCDMA and/or HSDPA signals, and the undesired signals may be inter-cell and/or intra-cell interference. Further processing may comprise HSDPA processing and/or RAKE finger processing. The communication signal may be a Universal Mobile Telecommunication System (UMTS) compliant signal.

The desired signals may comprise WCDMA and/or HSDPA signals, and the undesired signals may be inter-cell and/or intra-cell interference. Further processing may be HSDPA processing and/or RAKE finger processing. The communication signal may be a signal conforming to the Universal Mobile Telecommunication System (UMTS) standard. The estimated channel state information may comprise RAKE finger position estimates and channel coefficient estimates. The estimated channel state information may be formatted in an interference cancellation preprocessor. The reduced interference signal may be generated in an interference cancellation core processor, and the interference cancellation core processor may comprise an interference cancellation engine. The reduced interference signal for the further processing may be formatted in an interference cancellation postprocessor.

Figure 1:
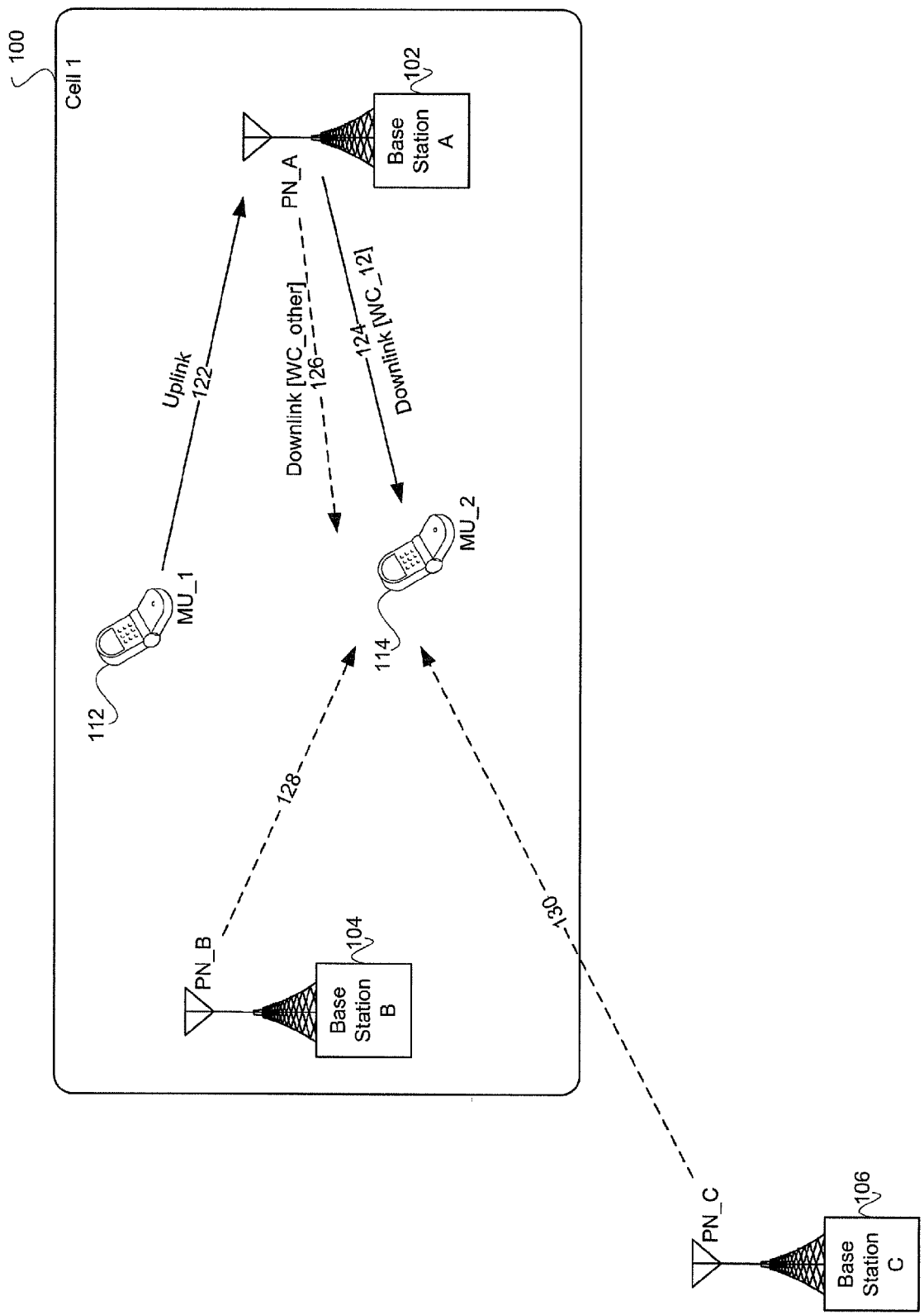
FIG. 1 is an illustration of an exemplary wireless communication system, in accordance with an embodiment.

FIG. 1 is an illustration of an exemplary wireless communication system, in accordance with an embodiment. Referring to FIG. 1, there is shown a cell 100 and a BTS C 106. The cell 100 comprises BTS A 102, BTS B 104, mobile communication device MU_1 112 and mobile communication device MU_2 114. The BTS 106 may be located outside of the cell 100.

The mobile communication devices MU_1 112 and MU_2 114 may be engaged in communication via the BTS A 102. The mobile communication device MU_1 112 may transmit signals to the BTS A 102 via an uplink RF channel 122. In response, the BTS A 102 may transmit signals to the mobile communication device MU_2 114 via a downlink RF channel 124. Signals transmitted by the BTS A 102 may communicate chips that are generated utilizing a scrambling code PN_A. The signals transmitted via RF channel 124 may be spread utilizing a spreading code WC_12. The spreading code WC_12 may comprise an orthogonal variable spreading factor (OVSF) code, for example a Walsh code, which enables the mobile communication device MU_2 114 to distinguish signals transmitted by the BTS A 102 via the downlink RF channel 124 from signals transmitted concurrently by the BTS A 102 via other downlink RF channels, for example downlink RF channel 126. The BTS A 102 may utilize one or more OVSF codes, WC_other, when spreading data transmitted via downlink RF channel 126. The one or more OVSF codes, WC_other, may be distinct from the OVSF code WC_12.

The mobile communication device MU_2 114 may receive MAI signals from RF channel 126, RF channel 128 and/or RF channel 130. As stated above, the signals received via RF channel 126 may be transmitted by the BTS A 102. The signals received via RF channel 128 may be transmitted by the BTS B 104. The signals transmitted by the BTS 104 may be scrambled based on a scrambling code PN_B. The signals received via RF channel 130 may be transmitted by the BTS C 106. The signals transmitted by the BTS C 106 may be scrambled based on a scrambling code PN_C.

The mobile communication device MU_2 114 may be operable to perform a soft handoff from the current serving BTS A 102 to any of a plurality of BTSs located within the cell 100, for example, the BTS B 104. Accordingly, the mobile communication device MU_2 114 may be operable to process received signals based on scrambling code PN_A and/or scrambling code PN_B. In this regard, the mobile communication device MU_2 114 may send data to the BTS A 102 and/or the BTS B 104, and data destined for mobile communication device MU_2 114 may be received via the BTS A 102 and/or the BTS B 104. Thus, the BTS A 102 and the BTS B 104 may be referred to as "listened" BTSs. Conversely, the mobile communication device MU_2 114 may not be operable to perform a soft handoff from the current serving BTS A 102 to a BTS that is outside of the cell 100—the BTS C 106, for example. In this regard, the mobile communication device MU_2 114 may not transmit data to the BTS C 106 or receive data destined for the mobile communication device MU_2 114 from the BTS C 106. Accordingly, the BTS A 102 and the BTS B 104 may be referred to as "non-listened" BTSs.

While the desired signal at the mobile communication device MU_2 114 may be received via RF channel 124, the mobile communication device MU_2 114 may also receive signal energy via the RF channel 126, the RF channel 128 and/or the RF channel 130. The received signal energies from the RF channels 126, 128 and/or 130 may result in MAI, which may interfere with the ability of the mobile communication device MU_2 114 to receive desired signals via RF channel 124. Accordingly, in various aspects of the invention, the mobile communication device MU_2 114 is operable to suppress interference resulting from undesired signals transmitted by listened BTSs. Additionally, even though the BTS is not a listened BTS, information transmitted on the RF channel 130—data transmitted to mobile communication devices other than mobile communication device MU_2 114—may nevertheless interfere with the desired signals on the RF channel 124. Accordingly, in various aspects of the invention, the mobile communication device MU_2 114 is operable to suppress interference from the non-listened BTS 106, or non-listened BTSs.

In various embodiments of the invention, the mobile communication device MU_2 may comprise suitable logic, circuitry and/or code that are operable to receive signal energy via the RF channels 124, 126, 128 and/or 130, and suppress interference signal energy received via the RF channels 126, 128 and/or 130. The mobile communication device MU_2 may utilize an iterative method for interference cancellation. The iterative method may comprise a weighting iteration, one or more weighting and addback iterations, and additional addback iterations. For the mobile communication devices 112 and 114 to process multipath information, each of the channels 124, 126, 128, and 130 of FIG. 1A may represent multiple paths, where those multiple paths are separated by a time delay.

Figure 2:
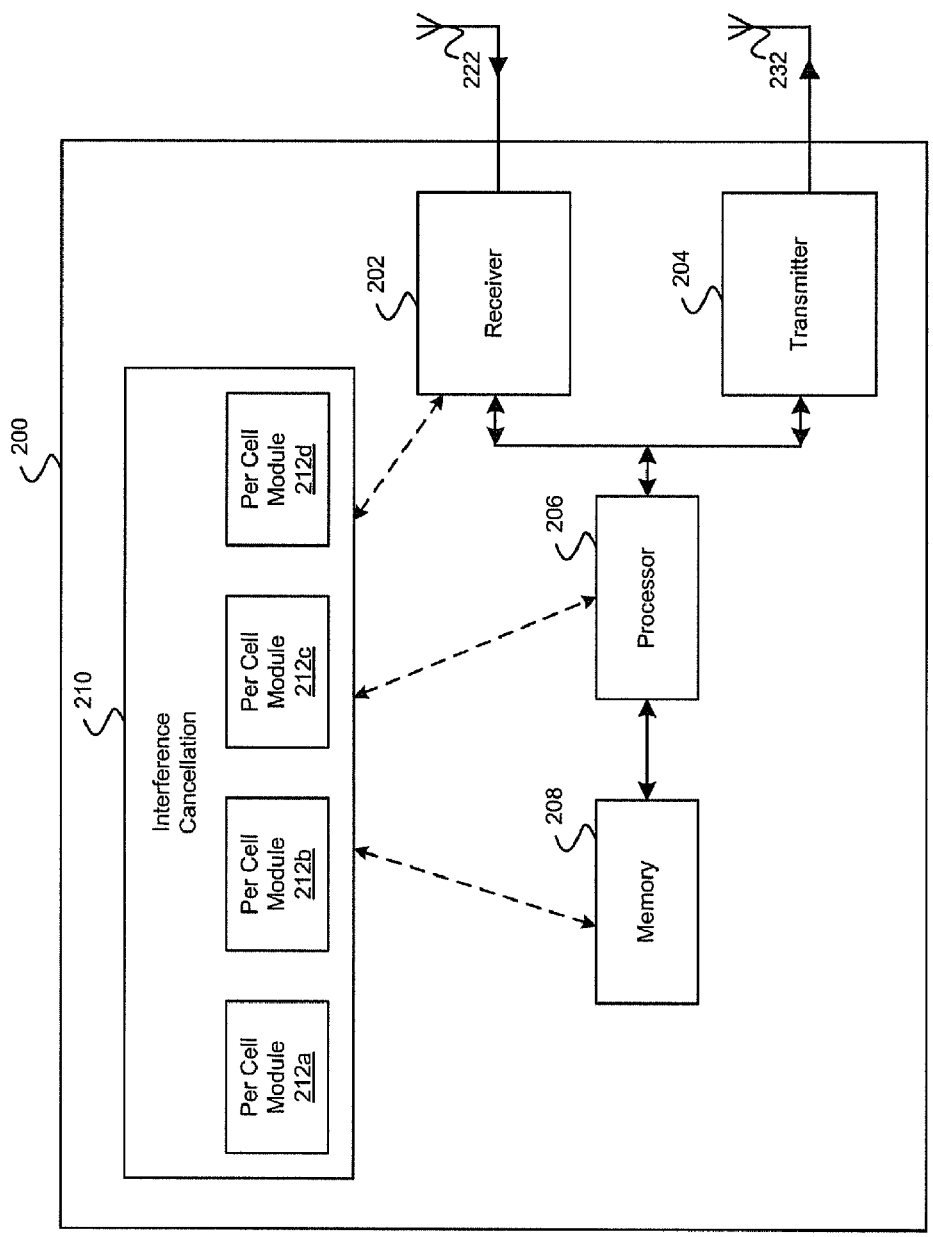
FIG. 2 is a diagram of an exemplary communication device, which is operable to provide interference suppression for WCDMA, in accordance with an embodiment of the invention.

FIG. 2 is a diagram of an exemplary communication device, which may utilize interference suppression for WCDMA, in accordance with an embodiment of the invention. Referring to FIG. 2, there is shown a transceiver system 200, a receiving antenna 222, and a transmitting antenna 232. The transceiver system 200 may comprise a receiver 202, a transmitter 204, a processor 206, an interference cancellation module 210 and a memory 208. The interference cancellation module 210 may comprise a plurality of per cell modules 212a, 212b, 212c and 212d. Although a separate receiver 202 and transmitter 204 are illustrated by FIG. 2, the invention is not limited. In this regard, the transmit function and receive function may be integrated into a single transceiver block. The transceiver system 200 may also comprise a plurality of transmitting antennas and/or a plurality of receiving antennas, for example to support diversity transmission and/or diversity reception. Various embodiments of the invention may comprise a single antenna, which is coupled to the transmitter 204 and receiver 202 via a transmit and receive (T/R) switch. The T/R switch may selectively couple the single antenna to the receiver 202 or to the transmitter 204 under the control of the processor 206, for example.

The receiver 202 may comprise suitable logic, circuitry, interfaces and/or code that may be operable to perform receive functions that may comprise PHY layer function for the reception or signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 222. The receiver 202 may process the received RF signals to generate baseband signals. A chip-level baseband signal may comprise a plurality of chips. The chip-level baseband signal may be descrambled based on a PN sequence and despread based on an OVSF code, for example a Walsh code, to generate a symbol-level baseband signal. The symbol-level baseband signal may comprise a plurality of data symbols. The receiver 202 may comprise a rake receiver, which in turn comprises a plurality of rake fingers to process a corresponding plurality of received multipath signals.

The transmitter 204 may comprise suitable logic, circuitry, interfaces and/or code that may be operable to perform transmit functions that may comprise PHY layer function for the transmission or signals. These PHY layer functions may comprise, but are not limited to, modulation of received data to generate data symbols based on application of a selected modulation type, generation of frequency carrier signals corresponding to selected RF channels, for example uplink or downlink channels, the up-conversion of the data symbols by the generated frequency carrier signals, and the generation and amplification of RF signals. The RF signals may be transmitted via the transmitting antenna 232.

The memory 208 may comprise suitable logic, circuitry, interfaces and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM).

The interference cancellation module 210 may comprise suitable logic, circuitry and/or code that are operable to suppress interference signals, relative to a desired signal, in a received signal. The received signal may comprise one or more desired signals and one or more interference signals. The interference cancellation module 210 may generate interference suppressed versions of the one or more signals in which the signal level for the interference signals is reduced relative to the signal level for the desired signal. In this regard, the interference suppressed version of the signal may be an estimate of the signal as transmitted.

Each of the per-cell modules 212a, 212b, 212c, and 212d may comprise suitable logic, circuitry, interfaces, and/or code that may be operable to generate an interference suppressed version of a signal received from a particular listened or non-listened BTS. Each of the per-cell modules 212a, 212b, 212c and 212d may be associated with a particular signal source, where the signal source may be identified by a particular PN sequence and may correspond to a particular transmit antenna of a particular BTS. In this regard, each of the per-cell modules 212a, 212b, 212c, and 212d may be individually configured with a PN sequence corresponding to the associated BTS. In generating a an interference suppressed version of a received signal, each of the per-cell modules 212a, 212b, 212c and 212d may be operable to perform a weighting iteration, one or more weighting and addback iterations, and/or an addback iteration on the received signal.

In operation, the receiver 202 may receive signals via the receiving antenna 222. In various embodiments of the invention, the receiver 202 may utilize a plurality of receiving antennas. In an exemplary embodiment of the invention, the receiver 202 may comprise a rake receiver. The receiver 202 may communicate signals to the processor 206 and/or to the interference cancellation module 210.

The receiver 202 may generate timing information that corresponds to each of the fingers in the rake receiver portion of the receiver 202. Each of the fingers in the rake receiver may process a distinct one of a plurality of multipath signals that are received within a delay spread time duration. In instances where the receiver 202 utilizes a plurality of receiving antennas, the receiver 202 may associate each of the plurality of multipath signals with a receiving antenna through which the multipath signals was received by the receiver 202. Based on received multipath signals, the receiver 202 may generate chip-level baseband signals.

The receiver 202 may communicate the chip-level baseband signals and/or generated timing information to the interference cancellation module 210. The rake receiver 202 may generate one or more descrambled baseband signals for each receive antenna utilized by the receiver 202 based on a corresponding selected one or more PN sequences. The descrambled baseband signals and/or generated timing information may be communicated to the processor 206. For example, referring to FIG. 1, the rake receiver 202 associated with mobile communication device MU_2 may select a PN sequence, PN_A, which may then be utilized to generate the descrambled baseband signals from the chip-level baseband signal. The descrambled baseband signals communicated to the processor 206 may comprise common pilot channel (CPICH) information.

In instances where the receiver 202 utilizes a plurality of receiving antennas, the receiver 202 may generate one or more descrambled baseband signals for each receiving antenna based on the corresponding multipath signals received by the receiver 202. Each of the descrambled baseband signals, generated from signals received via a corresponding receiving antenna, may be respectively communicated to the processor 206.

The processor 206 may utilize CPICH information to compute a plurality of channel estimate values or, in various embodiments of the invention, the receiver 202 may compute the channel estimate values. The processor 206 and/or receiver 202 may compute one or more channel estimate values corresponding to each multipath signal, which was transmitted by a given transmit antenna of a given BTS and received at a finger in the rake receiver via a given receiving antenna. The computed channel estimate values may be represented as a channel estimate matrix, $H_{bts,rx,fgr}$, where bts represents a numerical index that is associated with a given BTS, rx represents a numerical index that is associated with a given receiving antenna, and fgr is a numerical index that is associated with a given rake finger. The processor 206 may be operable to communicate the computed channel estimate values to the receiver 202 and/or to the interference cancellation module 210 and/or to the memory 208. The processor 206 may compute and/or select one or more interference cancellation parameter values, which control the signal interference cancellation performance of the interference cancellation module 210. The processor 206 may communicate the interference cancellation parameter values to the interference cancellation module 210 and/or to the memory 208.

The processor 206 may identify one or more BTSs with which the transceiver 200 may communicate. The one or more BTSs may comprise a current serving BTS and one or more handoff BTSs. The processor 206 may determine a PN sequence for each of the identified one or more BTSs. The processor 206 may configure one or more of the per-cell modules 212a, 212b, 212c and 212d with a corresponding selected one or more PN sequences, wherein each selected PN sequence may be selected from the set of determined PN sequences.

In various embodiments of the invention, the processor 206 may identify one or more BTSs, which with respect to the transceiver 200, are neither a current serving BTS nor a handoff BTS. These base stations may be referred to as non-listened BTSs. The processor 206 may determine a PN sequence for each identified non-listened BTS. The processor 206 may configure one or more of the per-cell modules 212a, 212b, 212c and 212d with a corresponding selected PN sequence for one or more non-listened BTSs.

The following is a discussion of exemplary operation for the per-cell module 212a. The operation of per-cell modules 212b, 212c and 212d is substantially similar to the operation of per-cell module 212a as described below.

The processor 206 may also configure the per-cell module 212a with interference cancellation parameter values. In various embodiments of the inventions, the interference cancellation parameter values configured for per-cell module 212a may be equal to corresponding interference cancellation parameter values utilized by other per-cell modules 212b, 212c and 212d. In other embodiments of the invention, the interference cancellation parameter values configured for the per-cell module 212a may be selected independently from the corresponding interference cancellation parameter values utilized by other per-cell modules 212b, 212c and 212d.

The processor 206 may associate one or more rake fingers with the per-cell module 212a. The processor 206 may communicate the channel estimate values, $H_{bts,rx,fgr}$, corresponding to each finger, fgr, associated with the per-cell module 212a. The receiver 202 may communicate timing information for each corresponding rake finger. The processor 206 may configure the per-cell module 212a with a PN sequence corresponding to a BTS.

In an exemplary embodiment of the invention, the processor 206 may configure the per-cell module 212a with the PN sequence for a serving BTS 102, for example PN_A. Accordingly, the receiver 202 may communicate channel estimate values, $H_{bts,rx,fgr}$, and timing information for signals transmitted via RF channel 124 and received via receiving antenna 222 for each corresponding finger in the rake receiver that is associated with the per-cell module 212a. The per-cell module 212a may generate and/or retrieve a plurality of OVSF codes and/or one or more interference cancellation parameter values in the memory 208. In various embodiments of the invention, the plurality of OVSF codes may comprise one or more OVSF codes, which may potentially be utilized by the BTS 102 to generate signals transmitted via RF channel 124. In an exemplary embodiment of the invention, the plurality of OVSF codes comprises 256 distinct Walsh codes. While the per-cell module 212a is associated with the serving BTS 102, each of the remaining per-cell modules 212b, 212c, and 212d may be associated with a different listened or non-listened BTS.

In another exemplary embodiment of the invention, the processor 206 may configure the per-cell module 212a with the PN sequence for a handoff BTS 104, for example PN_B. Accordingly, the receiver 202 may communicate channel estimate values, $H_{bts,rx,fgr}$, and timing information for signals transmitted via RF channel 128 and received via receiving antenna 222 for each corresponding finger in the rake receiver that is associated with the per-cell module 212a. While the per-cell module 212a is associated with the handoff BTS 104, each of the remaining per-cell modules 212b, 212c, and 212d may be associated with a different listened or non-listened BTS.

In another exemplary embodiment of the invention, the processor 206 may configure the per-cell module 212a with the PN sequence for a non-listened BTS 106, for example PN_C. Accordingly, the receiver 202 may communicate channel estimate values, $H_{bts,rx,fgr}$, and timing information for signals transmitted via RF channel 130 and received via receiving antenna 222 for each corresponding finger in the rake receiver that is associated with the per-cell module 212a. While the per-cell module 212a is associated with the non-listened BTS 104, each of the remaining per-cell modules 212b, 212c, and 212d may be associated with a different listened or non-listened BTS.

In instances in which the transceiver system 200 utilizes a plurality of receiving antennas, for example the receiving antennas 222_1 and 222_2, the transceiver system 200 may utilize receive diversity. In a receive diversity system, the receiver 202 may receive a first set of signals via the receiving antenna 222_1 and a second set of signals via the receiving antenna 222_2. The processor 206 may configure the per-cell module 212a, as described above, to receive signals via the receiving antenna 222_1 and/or receiving antenna 222_2.

In a transceiver system 200, which utilizes receive diversity, the processor 206 may compute a first set of channel estimate values corresponding to receiving antenna 222_1 and a second set of channel estimate values corresponding to receiving antenna 222_2. The computed channel estimate values may be represented as a channel estimate matrix, $H_{bts,rx,fgr}$, where rx represents a numerical index that is associated with a given receiving antenna. The receiver 202 may generate a first set of timing information for signals received via the receiving antenna 222_1 and the receiver 202 may generate a second set of timing information for signals received via the receiving antenna 222_2. In various embodiments of the invention, which utilize receive diversity, the receiver 202 and/or the interference cancellation module 210 may also process signals that are transmitted by BTSs, which utilize signal transmission diversity.

After being configured for interference cancellation operation, the per-cell module 212a may receive one or more multipath signals, each associated with one or more receive antennas, from the receiver 202 via a corresponding one or more rake fingers that are associated with the per-cell module 212a. The signals received by the per-cell module 212a may comprise chip-level baseband signals. The per-cell module 212a may combine the received one or more chip-level signals by utilizing the corresponding channel estimate values, and/or the corresponding timing information, based on, for example, maximal ratio combining (MRC) and/or equal gain combining (EGC). The per-cell module 212a may utilize the configured PN sequence to descramble the combined chip-level signal. Based on this descrambling of the combined signals, the per-cell module 212a may generate descrambled signals.

The per-cell module 212a may process the descrambled signals by utilizing each of the plurality of OVSF codes to generate a corresponding plurality of symbol-level signals. Each symbol-level signal associated with an OVSF code may be referred to herein as a corresponding user signal, although it should be noted that multiple OVSF codes may be associated with a single user and thus there is not necessarily a one-to-one correspondence between OVSF codes and users. For example, a signal associated with a $j^{th}$ OVSF code may be referred to as a $j^{th}$ user signal. Referring to FIG. 1, for example, the OVSF code WC_12 may be associated with a user signal that is transmitted from base station A 102 to the mobile telephone MC_2 114.

The per-cell module 212a may compute a signal power level value and a noise power level value corresponding to each of the user signals. Based on the computed signal power level value, noise power level value and the one or more interference cancellation parameter values, the per-cell module 212a may compute a weighting factor value corresponding to each user signal. The plurality of weighting factor values associated with each BTS may be represented as a weighting factor matrix, $A_{bts}$, where bts represents a numerical index value that is associated with a given BTS. In an exemplary embodiment of the invention, the weighting factor values for a given BTS may be computed as illustrated by the following equations:

$$z_j \cong \frac{\lambda x_j^2}{\lambda x_j^2 + y_j^2} \quad [1a]$$

when $$x_j^2 > \gamma y_j^2 \quad [1b]$$

and:

$$z_j = 0 \quad [1c]$$

when $$x_j^2 < \gamma y_j^2 \quad [1d]$$

where $z_j$ represents the weighting factor value for the $j^{th}$ user signal and j may be, for example, an integer from 0 to J; $x_j^2$ represents the signal power level value for the $j^{th}$ user signal, which was generated by descrambling a received signal based on a PN sequence for the given BTS and despreading the descrambled signal utilizing the OVSF code associated with the $j^{th}$ user; $y_j^2$ represents the noise power level value for the $j^{th}$ user signal, which was generated by descrambling the received signal based on the PN sequence for the given BTS and despreading the descrambled signal utilizing the OVSF code associated with the $j^{th}$ user; and $\lambda$ and $\gamma$ represent interference cancellation parameter values.

The weighting factor values $z_j$ may correspond to a signal to noise ratio (SNR) measure for the $j^{th}$ user signal. Values for $z_j$ may be within the range $0 \leq z_j^2 \leq 1$. In one regard, values of $z_j$ may be an a priori measure of confidence that a given user signal comprises valid signal energy that was transmitted by the BTS.

In various embodiments of the invention, the per-cell module 212a may be operable to process received chip-level signals by performing a weighting iteration, one or more weighting and addback iterations and an addback iteration. During the weighting iteration, the per-cell module 212a may receive a chip-level multipath signal from each associated finger and generate a corresponding estimated chip-level signal for each associated finger. During the one or more weighting and addback iterations, the per-cell module 212a may receive a residual chip-level signal from each associated finger and generate a corresponding incremental chip-level signal for each associated finger. During the addback iteration, the per-cell module 212a may receive an updated residual chip-level signal from each associated finger and generate a corresponding interference suppressed chip-level signal for each associated finger. The interference suppressed chip-level signal may correspond to an interference suppressed version of the received multipath signal. The interference suppressed chip-level signals may be output to each corresponding rake finger. Each of the rake fingers may then process its respective interference suppressed chip-level signals.

Figure 3:
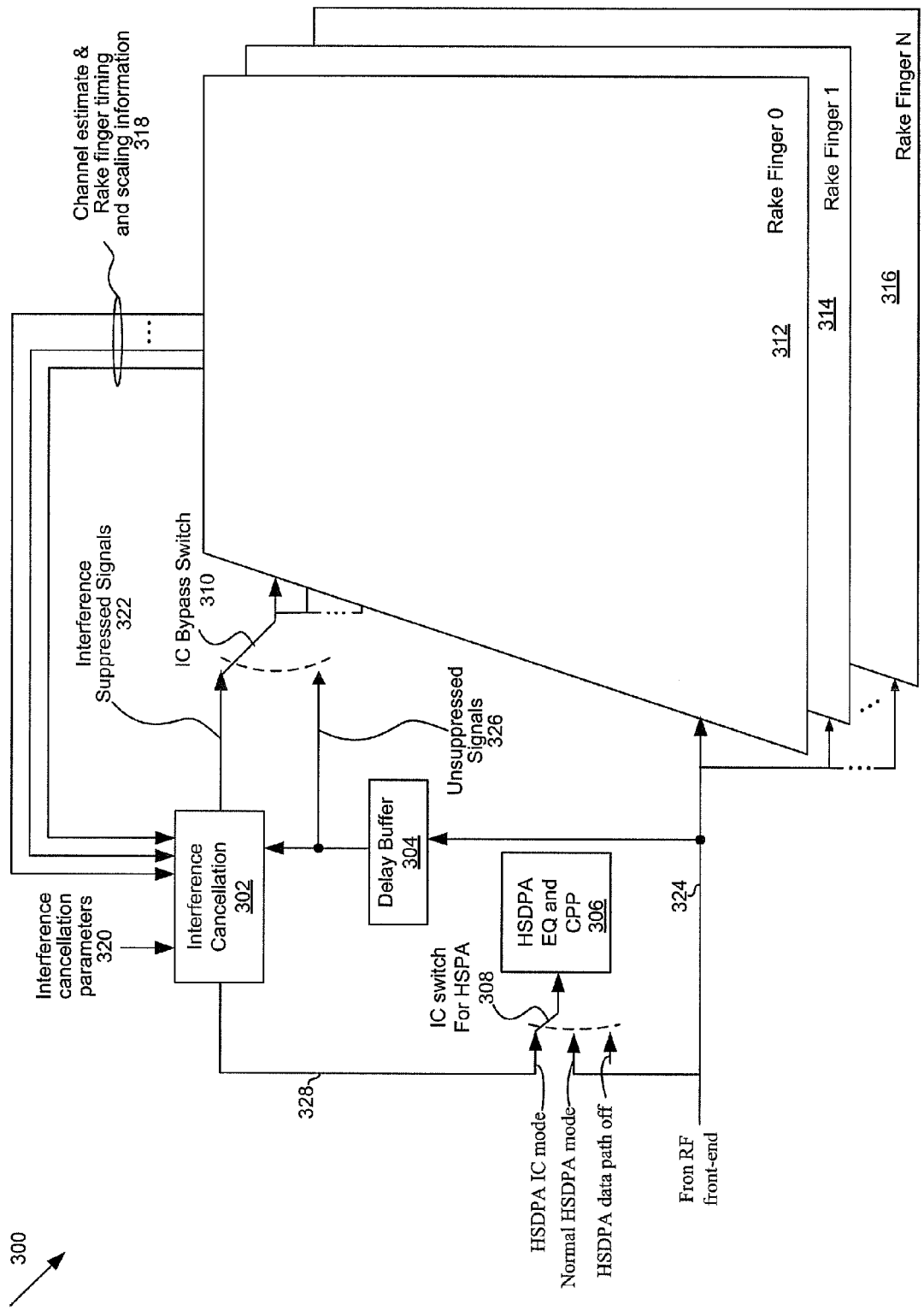
FIG. 3 is a diagram of an exemplary WCDMA receiver with interference suppression, in accordance with an embodiment of the invention.

FIG. 3 is a diagram of an exemplary WCDMA receiver with interference suppression, in accordance with an embodiment of the invention. Referring to FIG. 3, there is shown a WCDMA receiver 300 comprising an interference cancellation module 302, a delay buffer 304, a HSDPA processor 306, an HSDPA switching device 308, interference cancellation (IC) bypass switching device 310, and a plurality of rake fingers 312, 314 and 316. The interference cancellation module 302 may correspond to the interference cancellation module 210 as presented in FIG. 2. The rake fingers 312, 314 and 316 represent fingers in a rake receiver. In an exemplary embodiment of the invention, the HSDPA switching device 308 and the IC bypass switching device 310 may be configured by the processor 206.

The delay buffer 304 may comprise suitable logic, circuitry, interfaces and/or code that may be operable to receive a burst of a chip-level signal 324 as input at a given input time instant and output it as a burst of a chip-level signal 326 at a subsequent output time instant. The time duration between the input time instant and the output time instant may be referred to as a delay time duration. In an exemplary embodiment of the invention, the delay time duration corresponds to 512 chips.

The HSDPA processor 306 may comprise suitable logic, circuitry, interfaces and/or code that may be operable to provide HSDPA processing of received signals.

In operation, the HSDPA switching device 308 may comprise suitable logic, circuitry, interfaces and/or code that are operable to select an input signal to the HSDPA processor 306. As illustrated with respect to FIG. 3, the HSDPA switching device 308 is configured so that it is operable to supply an interference suppressed signal 328, generated by the interference cancellation module 302, as an input to the HSDPA processor 306. As indicated in FIG. 3, this configuration of the HSDPA switching device 308 may result in the HSDPA switching device 308 operating in a HSDPA interference cancellation (IC) mode.

The HSDPA switching device 308 may also be configured so that it is operable to supply the baseband signal 324, generated by the receiver 202, as an input to the HSDPA processor 306. As indicated in FIG. 3, this configuration of the HSDPA switching device 308 may result in the HSDPA switching device 308 operating in a normal HSDPA mode.

The HSDPA switching device 308 may also be configured such that no input signal is supplied to the HSDPA processor 306. As indicated in FIG. 3, this configuration of the HSDPA switching device 308 may result in the HSDPA switching device 308 operating in a HSDPA data path off mode.

The IC bypass switching device 310 may comprise suitable logic, circuitry, interfaces and/or code that are operable to select an input signal to the rake fingers 312, 314 and 316. As illustrated with respect to FIG. 3, the IC bypass switching device 310 is configured so that it is operable to supply an interference suppressed signal 322, generated by the interference cancellation module 302, as an input to the rake fingers 312, 314 and 316.

The IC bypass switching device 310 may also be configured so that it is operable to supply a signal 326, which is output from the delay buffer 304, as an input to the rake fingers 312, 314 and 316. The signal 326 output from the delay buffer 304 may comprise a time-delayed, and possibly up-sampled or down-sampled, version of the signal 324 generated by the receiver 202. As indicated in FIG. 3, the signal 326 output from the delay buffer 304 may comprise unsuppressed interference.

Each of the rake fingers 312, 314 and 316 may receive, as input, the chip-level baseband signal 324 generated by the receiver 202. Based on the input baseband signal 324 from the receiver 202, each rake finger 312, 314 and 316 may generate channel estimates and rake finger timing information. In various embodiments of the invention, each rake finger 312, 314 and 316 may generate the channel estimates and/or rake finger timing information for selected multipath signals based on CPICH data received via the input baseband signal 324 received from the receiver 202. In an exemplary embodiment of the invention, which comprises a receive diversity system, channel estimates and/or rake finger timing information may be generated for RF signals received at the receiver 202 via at least a portion of a plurality of receiving antennas. Each rake finger 312, 314 and 316 may communicate, as one or more signals 318, its respective channel estimates, rake finger timing information, scaling factors $K_{fgr}$, scrambling codes associated with one or more BTSs, and/or other information to the interference cancellation module 302.

In various embodiments of the invention, the interference cancellation module 302 may receive chip-level signals 326 from the delay buffer 304. Based on the channel estimates, rake finger timing, and/or other information communicated via the signal(s) 318, the interference cancellation module 302 may select individual multipath signals from the chip-level signals 326 received via the delay buffer 304. Based on the interference cancellation parameters 320, which may be as described with respect to FIG. 2, the interference cancellation module 302 may process the received chip-level multipath signal 326 utilizing an iterative method for interference cancellation, in accordance with an embodiment of the invention.

The chip-level signals 326 received from the delay buffer 304 may comprise a plurality of multipath signals received via one or more receive antennas from one or more transmit antennas of one or more BTSs. The interference cancellation module 302 may be configurable to assign signal processing resources to perform the iterative method of interference cancellation for selected multipath signals. The processor 206 may configure the interference cancellation module 302 to receive multipath signals from one or more transmit antennas of one or more listened and/or non-listened BTSs. In an exemplary embodiment of the invention, which comprises a receive diversity system, the selected multipath signals may be received via one or more of a plurality of receiving antennas. The processor 206 may configure the interference cancellation module 302 for receive diversity.

The interference cancellation module 302 may receive interference cancellation parameters 320 from the processor 206 and/or from the memory 208. In an exemplary embodiment of the invention, the interference cancellation module 302 may generate and/or retrieve PN sequences and/or OVSF codes from the memory 208. The PN sequences may be generated on the fly based on the code structure utilized by the BTS and/or based on timing information associated with the BTS. The interference cancellation module 302 may retrieve and/or generate a PN sequence for each of the one or more transmit antennas of the one or more BTSs from which the interference cancellation module 302 is configured to attempt to receive a signal and/or for one or more BTSs that are not listened to, but still may interfere with desired signals.

In various embodiments of the invention in which the receiver 202 utilizes a plurality of receiving antennas and/or receives data from a plurality of transmit antennas, data received via the symbol-level signals corresponding to the plurality of receiving antennas and/or transmit antennas may be decoded by utilizing various diversity decoding methods. Various embodiments of the invention may also be practiced when the receiver 202 is utilized in a multiple input multiple output (MIMO) communication system. In instances where the receiver 202 is utilized in a MIMO communication system, data received via the symbol-level signals, received via the plurality of receiving antennas, may be decoded by utilizing various MIMO decoding and/or diversity decoding methods.

Figure 4:
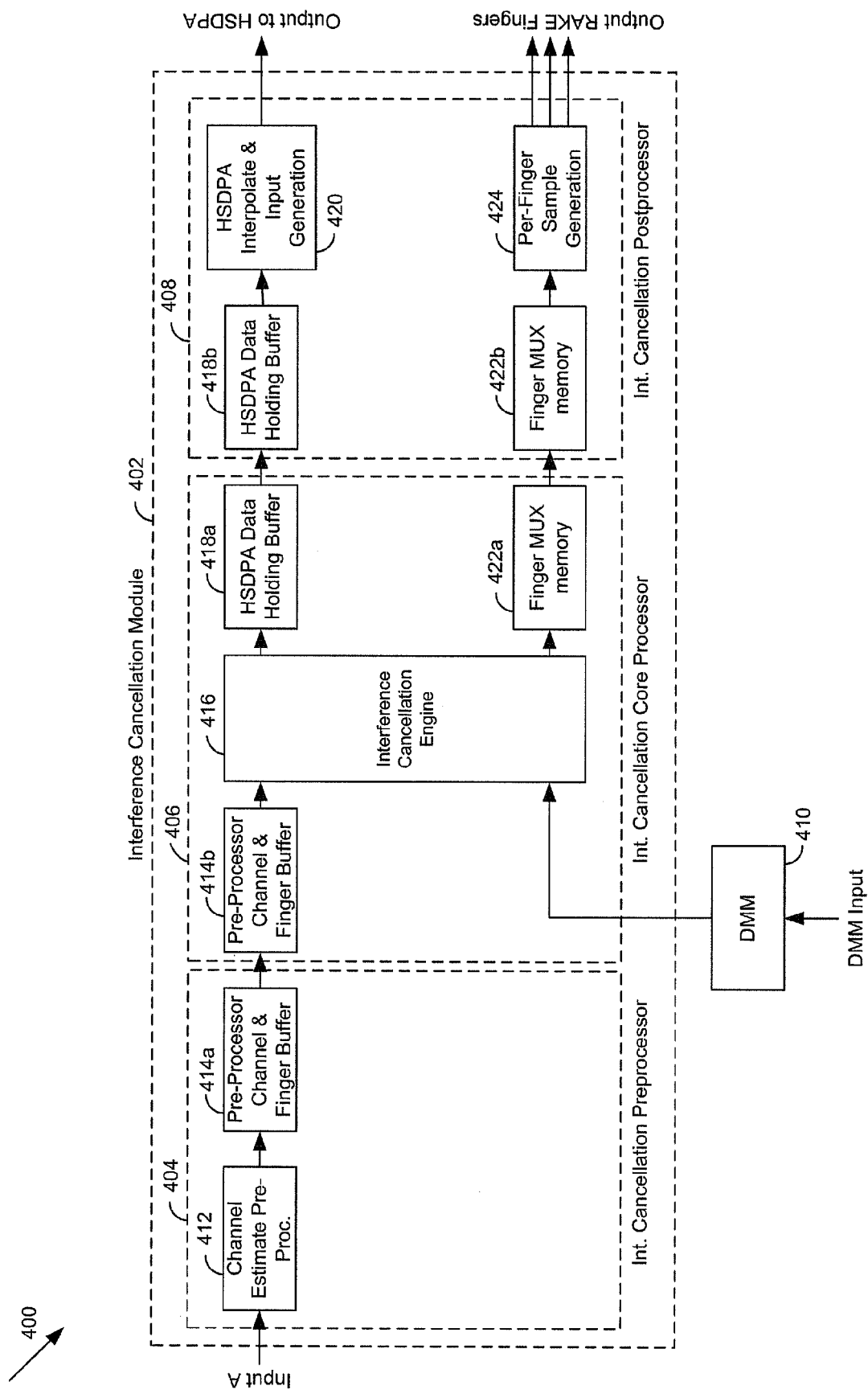
FIG. 4 is a block diagram illustrating exemplary interference cancellation module, in accordance with an embodiment of the invention.

FIG. 4 is a block diagram illustrating exemplary partitioning of an interference cancellation module, in accordance with various embodiments of the invention. Referring to FIG. 4, there is shown an interference suppression system 400 comprising an interference cancellation module 402, and a delay matched memory (DMM) 410. The interference cancellation module 402 may comprise an interference cancellation preprocessor 404, an interference cancellation core processor 406, and an interference cancellation postprocessor 408. The interference cancellation preprocessor 404 may comprise a channel estimate preprocessor 412, and a preprocessor channel and finger buffer 414a. The interference cancellation core processor 406 may comprise a preprocessor channel and finger buffer 414b, an interference cancellation engine 416, an HSDPA data holding buffer 418a, and a finger multiplexing (MUX) memory 422a. The interference cancellation postprocessor 408 may comprise an HSDPA data holding buffer 418b, a finger multiplexing (MUX) memory 422b, an HSDPA interpolation and input generation block 420, and a per-finger sample generation block 424.

The interference cancellation module 402 may comprise suitable logic, circuitry, code and/or interfaces that are operable to receive WCDMA input signals with interference, and generate RAKE finger output signals and/or HSDPA output signals with reduced intra-cell and/or inter-cell interference.

The interference cancellation preprocessor 404 may comprise suitable logic, circuitry, code and/or interfaces that are operable to receive, process, and delay channel information. The channel estimation preprocessor 412 may comprise suitable logic, circuitry, code and/or interfaces that are operable to receive channel information, for example RAKE finger positions, which maybe processed into a form suitable for interference suppression. The preprocessor channel and finger buffer 414a and 414b may comprise suitable logic, circuitry, code and/or interfaces that are operable to receive an input and generate an output that may be a delayed version of an input signal. The preprocessor channel and finger buffers 414a and 414b may be utilized to synchronize channel information with data arriving at the interference cancellation engine 416, for example from the DMM 410. The DMM 410 may comprise suitable logic, circuitry, code and/or interfaces that are operable to receive and delay block data.

The interference cancellation core processor 406 may comprise suitable logic, circuitry, code and/or interfaces that are operable to suppress inter-cell and intra-cell interference in one or more input signals, and to generate output signals with at least partially suppressed interference. The interference cancellation engine 416 may comprise suitable logic, circuitry, code and/or interfaces that are operable to perform interference cancellation based on input data from the DMM 410 and buffered channel information communicatively coupled from the preprocessor channel and finger buffer 414b. The HSDPA data holding buffers 418a and 418b may comprise suitable logic, circuitry, code and/or interfaces that are operable to receive and store an input signal, and generate an output signal that may be a delayed version of the input signal, for example. The output signals from the interference cancellation engine 416 may be communicatively coupled to an HSDPA data holding buffer 418a and/or a finger multiplexer memory 422a. The finger MUX memory 422a and 422b may comprise suitable logic, circuitry, code and/or interfaces that are operable to receive and store input data, and output stored data via a multiplexer. The HSDPA interpolation and input generation block 420 may comprise suitable logic, circuitry, code and/or interfaces that are operable to receive an input signal and generate an interpolated and suitably processed output signal, which may be utilized to feed an exemplary HSDPA receiver. The per-finger sample generation block 424 may comprise suitable logic, circuitry, code and/or interfaces that are operable to process and format an input signal comprising data for one or more RAKE fingers, and generate one or more output signals suitable for processing by a RAKE finger receiver each.

The interference cancellation postprocessor 408 may comprise suitable logic, circuitry, code and/or interfaces that are operable to format input data suitable for processing by an HSDPA processor and/or RAKE fingers. In some cases, the postprocessor may be operable to format the output data from the interference cancellation core processor in accordance with legacy RAKE and/or HSDPA processors communicatively coupled to the outputs of the interference cancellation postprocessors 408.

The interference cancellation module 402 may operate in multiple different operation modes, which may generate RAKE finger outputs and/or HSDPA outputs, in which interference may be at least partially suppressed. The channel estimation preprocessor 412 may receive channel estimation and time tracking information from a RAKE finger CPICH processing block, for example from receiver 202, where the data may be processed into a suitable form for usage in the interference cancellation engine 416. In some instances, the interference cancellation preprocessor 404 may adapt the input signals from a legacy format into a format suitable for processing by the interference cancellation core processor 406. The preprocessor channel and finger buffers 414a and 414b may suitably buffer the preprocessed channel estimation data received from the channel estimation preprocessor 412, before the data is communicated to the interference cancellation engine 416.

The DMM 410 may be operable to receive block input data which may be suitably delayed to match up with corresponding channel estimation data that is communicatively fed to the interference cancellation engine 416 via Input A and the interference cancellation preprocessor 404. The interference cancellation engine 416 may generate RAKE finger data which may be communicated to the finger MUX memory 422a. The RAKE finger data communicated to the finger MUX memory 422a may be generated by suppressing interference for each individual finger, for example. The interference suppressed may comprise, for example, intra-cell and inter-cell interference. The output of the per-finger sample generation block 424 may be communicatively coupled to a RAKE Dedicated Physical Data Channel (DPDCH) processing block, for example.

The interference cancellation engine 416 may further generate HSDPA output data that is communicated to the HSDPA data holding buffers 418a and 418b. The HSDPA output generated in the interference cancellation engine 416 may comprise one or more HSDPA signals for which the interference cancellation engine 416 may have at least partly suppressed interference. The one or more output signals of the interference cancellation engine 416 may correspond to one or more path components of a multipath signal, in accordance with various embodiments of the invention. The interference suppressed in the interference cancellation engine 416 may be intra-cell and/or inter-cell interference. The HSDPA interpolation and input generation block 420 may receive the data buffered in the HSDPA data holding buffer 418b, and interpolate and format the data so that it may be processed further by an HSDPA processor that is communicatively coupled, for example, to the output of the HSDPA interpolation and input generation block 420.

Figure 5:
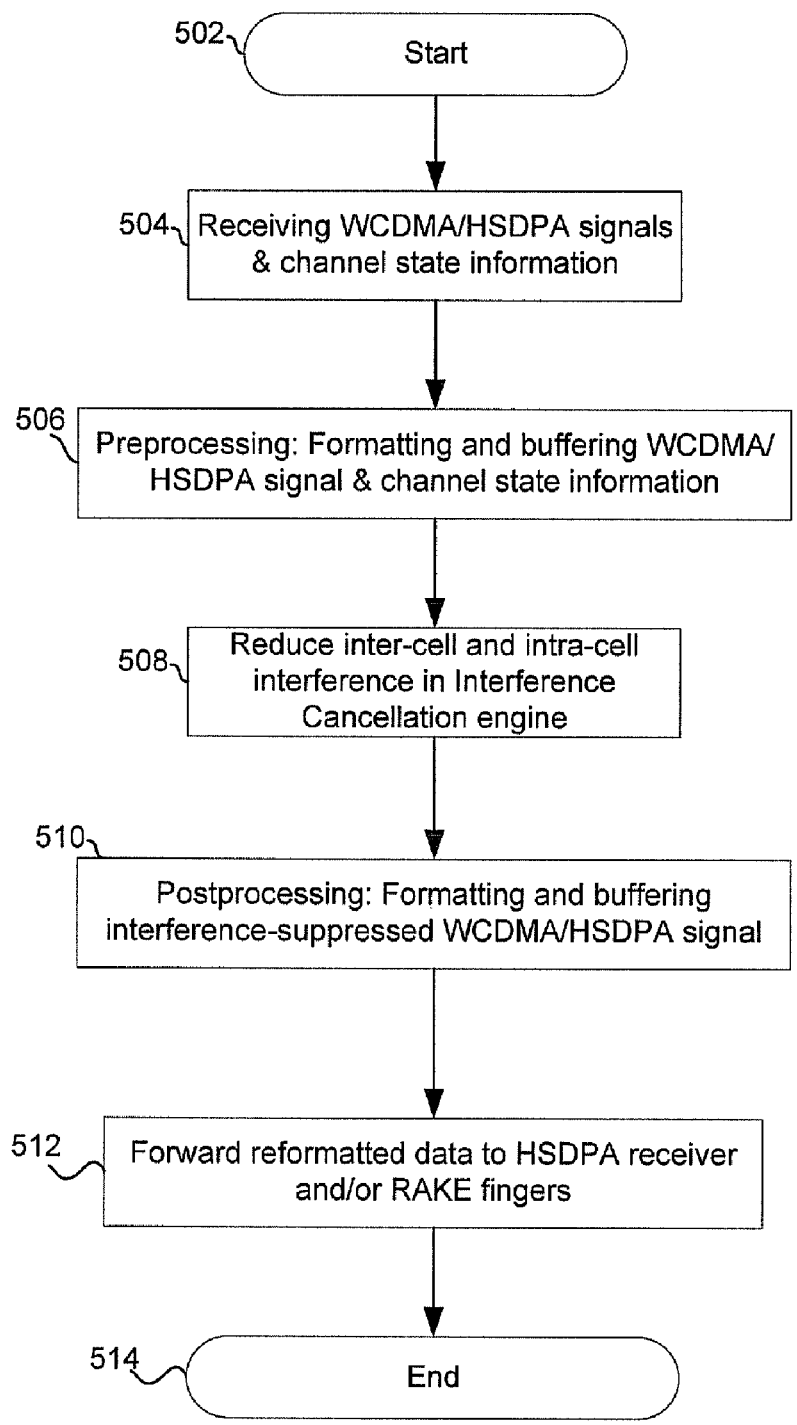
FIG. 5 is a flow chart illustrating exemplary steps for suppressing interference in received signals based on signals received from non-listened BTSs, in accordance with an embodiment of the invention.

FIG. 5 is a flow chart illustrating exemplary steps for suppressing interference in received signals based on signals received, in accordance with an embodiment of the invention. In step 504, channel state information comprising, for example, channel coefficients and finger positions, may be received at an interference cancellation preprocessor 404. Similarly, HSDPA and/or WCDMA data signals may be received at the interference cancellation core processor 406 via the DMM 410, for example. In step 506, the interference cancellation preprocessor 404 may process the channel state information in a manner to make it suitable for interference cancellation in the interference cancellation core processor 406. In addition, the information may be buffered, so as to synchronize the channel state information to the HSDPA and/or WCDMA signals received via the DMM 410. In step 508, the interference cancellation core processor 406 may process the channel state information received via the interference cancellation preprocessor 404 and the DMM 410 to reduce and at least partially suppress intra-cell and inter-cell interference. The one or more output signals generated by the interference cancellation core processor may be communicatively coupled to the interference cancellation postprocessor 408. In step 510, the interference cancellation postprocessor 408 may reformat and buffer the reduced-interference HSDPA and/or WCDMA signals generated in the interference cancellation core processor 406. In step 512, the one or more output signals generated in the interference cancellation postprocessor 408 may be communicatively coupled to an HSDPA processor and/or RAKE fingers for further processing.

Various aspects of a method and system for a programmable interference suppression module are provided. Aspects of the method and system for a programmable interference suppression module, for example Interference cancellation module 402 may comprise receiving a communication signal at an Input A comprising one or more desired signal, and one or more undesired signals, as illustrated in FIG. 3 and FIG. 4. From the communication signal, estimated channel state information may be generated in the channel estimation pre-processor 412. The communication signal may be delayed in the pre-processor channel and finger buffer 414a. The estimated channel state information may be formatted in the interference cancellation preprocessor 404 for use in interference suppression in the Interference cancellation core processor 406, for example. A reduced interference signal may be generated from the delayed communications signal and the estimated channel state information in the interference cancellation core processor 406, wherein the one or more undesired signals may be attenuated. The reduced interference signal may be formatted for post-processing, which may occur, for example, in the Interference cancellation postprocessor 408.

The desired signals may comprise WCDMA and/or HSDPA signals, and the undesired signals may be inter-cell and/or intra-cell interference, as described in FIG. 1 and FIG. 2. Further processing may comprise HSDPA processing, for example by the HSDPA processor 306, and/or RAKE finger processing in RAKE Fingers 312, 314, and 316. The communication signal may be a signal conforming to the Universal Mobile Telecommunication System (UMTS) standard. The estimated channel state information may comprise RAKE finger position estimates and channel coefficient estimates, as illustrated for FIG. 3, and FIG. 4. The estimated channel state information may be formatted in an interference cancellation preprocessor 404, for example. The reduced interference signal may be generated in an interference cancellation core processor 406, and the interference cancellation core processor 406 may comprise an interference cancellation engine 416. The reduced interference signal for the post-processing may be formatted in an interference cancellation postprocessor 408.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a programmable interference suppression module.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
performing by one or more circuits in a wireless communication device:
receiving a communications signal comprising one or more desired signal, and one or more undesired signals;
generating, from said communications signal, estimated channel state information;
formatting said estimated channel state information for use in interference suppression;
generating a reduced interference signal from a delayed version of said communications signal and said estimated channel state information, wherein said one or more undesired signals are attenuated; and
formatting said reduced interference signal for post-processing.

2. The method according to claim 1, wherein said desired signals comprise WCDMA and/or HSDPA signals.

3. The method according to claim 1, wherein said undesired signals are inter-cell and/or intra-cell interference.

4. The method according to claim 1, wherein said further processing is HSDPA processing and/or RAKE finger processing.

5. The method according to claim 1, wherein said communications signal is a signal conforming to the Universal Mobile Telecommunication System (UMTS) standard.

6. The method according to claim 1, wherein said estimated channel state information comprises RAKE finger position estimates and channel coefficient estimates.

7. The method according to claim 1, wherein said one or more circuits comprise an interference cancellation preprocessor, and said one or more circuits enable formatting of said estimated channel state information by said interference cancellation preprocessor.

8. The method according to claim 1, wherein said one or more circuits comprise an interference cancellation core processor, and said one or more circuits enable generating of said reduced interference signal by said interference cancellation core processor.

9. The method according to claim 8, wherein said interference cancellation core processor comprises an interference cancellation engine.

10. The method according to claim 1, wherein said one or more circuits comprise an interference cancellation postprocessor, and said one or more circuits enable formatting of said reduced interference signal for said further processing by interference cancellation postprocessor.

11. A system for signal processing, the system comprising:
one or more circuits for use in a wireless communication device, wherein said one or more circuits are operable to:
receive a communication signals comprising one or more desired signal, and one or more undesired signals;
generate, from said communications signal, estimated channel state information;
format said estimated channel state information for use in interference suppression;
generate a reduced interference signal from a delayed version of said communications signal and said estimated channel state information, wherein said one or more undesired signals are attenuated; and
format said reduced interference signal for post-processing.

12. The system according to claim 11, wherein said desired signals comprise WCDMA and/or HSDPA signals.

13. The system according to claim 11, wherein said undesired signals are inter-cell and/or intra-cell interference.

14. The system according to claim 11, wherein said further processing is HSDPA processing and/or RAKE finger processing.

15. The system according to claim 11, wherein said communications signal is a signal conforming to the Universal Mobile Telecommunication System (UMTS) standard.

16. The system according to claim 11, wherein said estimated channel state information comprises RAKE finger position estimates and channel coefficient estimates.

17. The system according to claim 11, wherein said one or more circuits comprise an interference cancellation preprocessor, and said one or more circuits are operable to format said estimated channel state information utilizing said interference cancellation preprocessor.

18. The system according to claim 11, wherein said one or more circuits comprise an interference cancellation core processor, and said one or more circuits are operable to generate said reduced interference signal utilizing said interference cancellation core processor.

19. The system according to claim 18, wherein said interference cancellation core processor comprises an interference cancellation engine.

20. The system according to claim 11, wherein said one or more circuits comprise an interference cancellation postprocessor, and said one or more circuits are operable to format said reduced interference signal for said further processing utilizing said interference cancellation postprocessor.

* * * * *

UNITED STATES PATENT AND TRADEMARK OFFICE
CERTIFICATE OF CORRECTION

| | |
|---|---|
| PATENT NO. | : 8,208,856 B2 |
| APPLICATION NO. | : 12/686623 |
| DATED | : June 26, 2012 |
| INVENTOR(S) | : Hahm et al. |

It is certified that error appears in the above-identified patent and that said Letters Patent is hereby corrected as shown below:

Column 16
Line 43, Claim 1, please replace "desired signal" with --desired signals--.

Column 17
Line 24, Claim 11, please replace "desired signal" with --desired signals--.

Signed and Sealed this
Thirtieth Day of October, 2012

David J. Kappos
*Director of the United States Patent and Trademark Office*